E. S. FOLK.
ROLLER BEARING.
APPLICATION FILED MAY 15, 1917.

1,232,523. Patented July 10, 1917.

Inventor
Edward S. Folk.
By J. W. Bond.
Attorney

UNITED STATES PATENT OFFICE.

EDWARD S. FOLK, OF CANTON, OHIO.

ROLLER-BEARING.

1,232,523.  Specification of Letters Patent.  Patented July 10, 1917.

Application filed May 15, 1917. Serial No. 168,666.

*To all whom it may concern:*

Be it known that I, EDWARD S. FOLK, a citizen of the United States, residing at Canton, in the county of Stark and State of Ohio, have invented a new and useful Roller-Bearing, of which the following is a specification.

The present invention relates to improvements in roller bearings and has more especial reference to a one piece self-retaining roller cage formed from sheet metal.

The object of the invention is to provide a simple construction adapted to be stamped from a single sheet of metal and bent into proper form to strengthen the structure and retain the rollers therein.

A further object is the provision of a roller bearing cage which will permit of easily assembling the rollers therein and which will retain the rollers after being assembled.

A still further object is the provision of a roller bearing cage of this character which will be inexpensive and simple to manufacture and efficient and durable in use.

With these objects in view the invention consists in the novel construction and arrangement of parts, hereinafter described, illustrated in the accompanying drawings, and particularly pointed out in the appended claims, it being understood that various changes in the form, proportions, size and minor details of construction may be made within the scope of the appended claims, without departing from the spirit or sacrificing any of the advantages of the invention.

In the accompanying drawings.

Similar numerals of reference indicate corresponding parts throughout the several figures of the drawings.

Figures 1, 2:
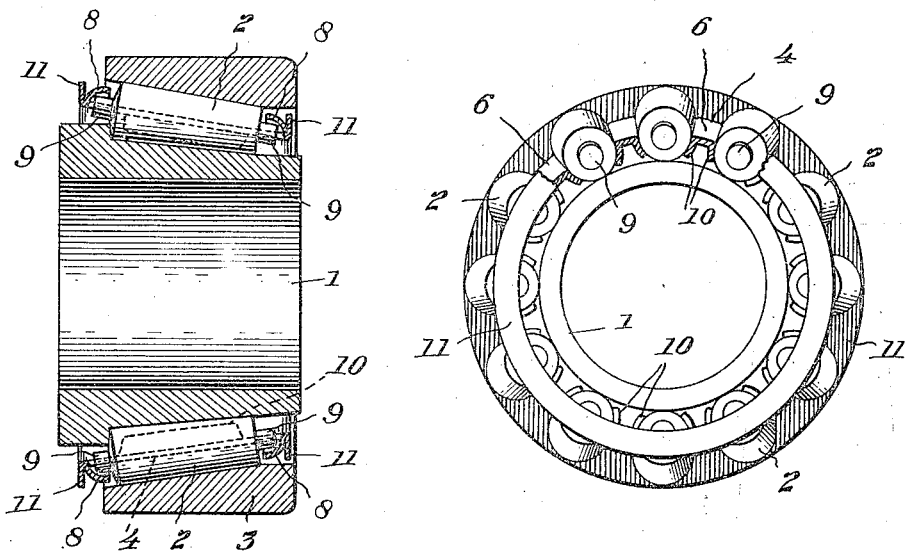
Figure 1 is a side elevation of a roller bearing embodying my invention, parts being broken away for the purpose of illustration, the outer race ring being omitted.
Fig. 2 is a transverse sectional view through the roller bearing.
Figure 3:
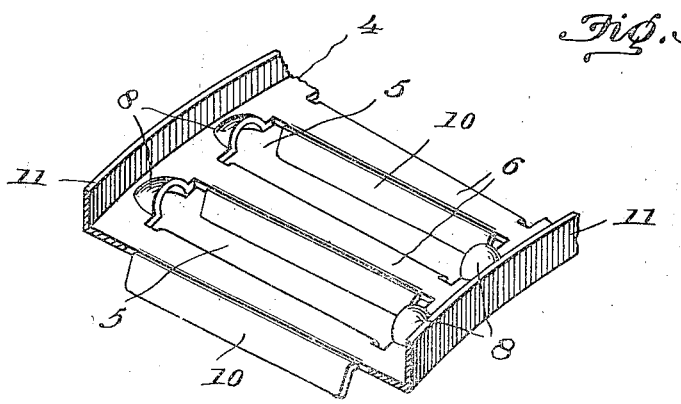
Fig. 3 is a detail perspective view upon an enlarged scale of a portion of the cage.

Referring more especially to the construction illustrated in the accompanying drawings, the numeral 1 indicates the usual inner bearing ring or cone upon which the rollers 2 are supported in the usual manner, the outer surface of said cone being of the proper contour to conform with the adjacent contacting faces of the rollers. The cage which is for the purpose of retaining the rollers in proper spaced relation between the bearings 1 and 3 is stamped from a sheet of metal and comprises a frusto-conical portion 4 provided at properly spaced intervals with the longitudinally disposed roller receiving slots 5, longitudinal spacing bars 6 being thus formed between the roller receiving slots 5.

An outwardly pressed pocket 8 is formed at each extremity of each of the slots 5 and arranged to receive the pintles 9 which are formed upon the rollers. An outwardly flared flange 10, projecting toward the center of the bearing is provided upon each longitudinal edge of each of the bars 6, said flanges being formed from the material which is cut out to form the slots 5.

Each edge of the cage is turned outwardly away from the center of the bearing forming straight annular reinforcing flanges 11 at the ends of the cage. It will be understood of course that the flanges 10 are preferably curved to conform with the contour of the rollers, thus forming a trough of proper size and shape between each adjacent pair of bars 6 in which a roller is received, the flanges 10 preventing the roller from falling through the slots 5 and the pockets 8 retaining the rollers within the troughs thus formed.

By this construction a cage is formed which is simple and inexpensive and which is not unnecessarily weakened by having parts cut out therefrom, the cage and rollers forming a single unit which may be easily and readily removed from a bearing or placed therein. It will also be understood that although in the drawing a conical bearing provided with conical rollers is illustrated that the rollers may be of cylindrical form and the cage properly formed to retain said rollers within a cylindrical bearing without departing from the spirit of the invention.

Although the drawings and above specification discloses the best mode in which I have contemplated embodying my invention I desire to be not limited to the details of such disclosure, for in the further practical application of my invention, many changes in form and construction may be made, as circumstances require or experience suggests, without departing from the spirit of the invention, within the scope of the appended claims.

I claim:

1. An integral metal cage for roller bearings having a series of spaced longitudinally disposed slots formed therein, inwardly disposed flanges provided along the edges of said slots and outwardly pressed pockets formed at the ends of said slots and adapted to surround the pintles of the rollers.

2. An integral metal cage for roller bearings having a series of spaced longitudinally disposed slots formed therein, inwardly disposed flanges provided along the edges of said slots, outwardly pressed pockets formed at the ends of said slots and adapted to surround the pintles of the rollers, and outwardly disposed, straight annular flanges formed at the ends of said cage.

In testimony that I claim the above, I have hereunto subscribed my name.

EDWARD S. FOLK.